United States Patent
Bishop et al.

(10) Patent No.: US 7,957,513 B2
(45) Date of Patent: Jun. 7, 2011

(54) METHOD, SYSTEM AND COMPUTER PROGRAM PRODUCT FOR PROVIDING A NO-RING TELEPHONE CALL SERVICE

(75) Inventors: Michael Bishop, Atlanta, GA (US); Hong Nguyen, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1937 days.

(21) Appl. No.: 10/719,476

(22) Filed: Nov. 21, 2003

(65) Prior Publication Data

US 2005/0111646 A1    May 26, 2005

(51) Int. Cl.
*H04M 3/42* (2006.01)
(52) U.S. Cl. .............................. 379/207.11; 379/211.02
(58) Field of Classification Search ............. 379/207.11, 379/211.01, 211.02, 212.01, 142.01, 373.01
See application file for complete search history.

(56) References Cited

U.S. PATENT DOCUMENTS

| | | | |
|---|---|---|---|
| 5,181,238 A * | 1/1993 | Medamana et al. ....... | 379/93.03 |
| 6,215,857 B1 * | 4/2001 | Kasiviswanathan ........ | 379/67.1 |
| 6,493,438 B1 | 12/2002 | Gross et al. | |
| 6,600,817 B1 * | 7/2003 | Shaffer et al. ............... | 379/199 |
| 6,775,696 B1 | 8/2004 | Hansen .......................... | 709/219 |
| 6,788,929 B2 | 9/2004 | Hymel ........................ | 455/412.2 |
| 7,162,027 B1 * | 1/2007 | Cannon et al. ............... | 379/382 |
| 2004/0054732 A1 | 3/2004 | Carter et al. | |
| 2005/0059382 A1 | 3/2005 | Brun et al. ................. | 455/412.1 |
| 2005/0100143 A1 | 5/2005 | Bedingfield, Sr. | |
| 2005/0111646 A1 | 5/2005 | Bishop et al. | |
| 2005/0184875 A1 | 8/2005 | Schmandt et al. | |
| 2006/0256948 A1 | 11/2006 | Crockett et al. | |

OTHER PUBLICATIONS

U.S. Appl. No. 10/900,596, filed on Jul. 28, 2004.

* cited by examiner

*Primary Examiner* — William J Deane
(74) *Attorney, Agent, or Firm* — Cantor Colburn LLP

(57) ABSTRACT

A method provides a no-ring telephone call service. The method includes receiving notification that a telephone call from a calling party device requesting to use the no-ring telephone call service has arrived at a switch. The notification includes a called party telephone number. The method also includes determining if the called party telephone number corresponds to a voice mail platform telephone number in a region wide messaging database. When the called party telephone number corresponds to a voice mail platform telephone number, instructions to route the telephone call to the voice mail platform telephone number are communicated to the switch. When the called party telephone number does not correspond to a voice mail platform telephone number, instructions to play a pre-recorded no voice mailbox message are communicated to the switch.

25 Claims, 3 Drawing Sheets

METHOD, SYSTEM AND COMPUTER PROGRAM PRODUCT FOR PROVIDING A NO-RING TELEPHONE CALL SERVICE

FIELD OF THE INVENTION

The present disclosure relates generally to methods for providing a no-ring telephone call service and in particular, to methods of routing a telephone call directly to a voice mail service.

BACKGROUND OF THE INVENTION

Voice mail systems allow a calling party to leave a message for a called party if the called party does not answer the telephone. With the widespread proliferation of cellular telephones it is possible for a calling party to reach a called party at any time and at almost any location. In the event that the called party is already speaking on the telephone or has the cellular telephone powered off, the calling party may leave a message for the called party on a voice mail system associated with the called party's telephone number. Currently, a called party may control whether a telephone call results in a calling party speaking to the called party or whether it results in requesting the calling party to leave a voice mail message.

In the most common cases a calling party may be trying to reach the called party to have a conversation and the voice mail system is utilized to leave a message requesting the called party to return the telephone call. In other cases, the calling party may not want to talk to the called party but to simply leave a message. The calling party may know that the called party is currently busy (e.g., in a business meeting, attending a class) and the calling party may not want to disturb the called party. In a case such as this, it may be desirable for the calling party to be connected directly to the called party's voice mailbox to leave a message. In other situations, the calling party may not have time to engage in a conversation with the called party, but may want to leave a brief message to update the called party on the status of a particular matter. Currently, there is no way for a calling party to choose to leave a message for a called party without first attempting to ring the called party's telephone. This can result in the calling party interrupting the called party at inconvenient times and can result in the calling party being forced to engage the called party in a conversation that might be unnecessary or that the calling party would like to avoid.

SUMMARY OF THE INVENTION

Embodiments of the present invention include a method for providing a no-ring telephone call service. The method includes receiving notification that a telephone call from a calling party device requesting to use the no-ring telephone call service has arrived at a switch. The notification includes a called party telephone number. The method also includes determining if the called party telephone number corresponds to a voice mail platform telephone number in a region wide messaging database. When the called party telephone number corresponds to a voice mail platform telephone number, instructions to route the telephone call to the voice mail platform telephone number are communicated to the switch. When the called party telephone number does not correspond to a voice mail platform telephone number, instructions to play a pre-recorded message are communicated to the switch.

Further embodiments of the present invention include a system for providing a no-ring telephone call service. The system includes a service control point and a switch in communication with the service control point. The switch includes a no-ring telephone call service trigger provisioned on a calling party line at the switch for triggering a query to the service control point whenever a telephone call including a no-ring telephone call service request is made by a calling party device. The system further includes a region wide messaging database in communication with the service control point and a no-ring telephone call application accessed by the service control point. The no-ring telephone call application responds to the query by determining whether a called party telephone number corresponds to a voice mail platform telephone number in the region wide messaging database. When the called party telephone number corresponds to a voice mail platform telephone number, instructions to route the telephone call to the voice mail platform telephone number are communicated to the switch. When the called party telephone number does not correspond to a voice mail platform telephone number, instructions to play a pre-recorded message are communicated to the switch.

Additional embodiments of the present invention include a system for providing a no-ring telephone call service. The system includes an application server and a switch in communication with the application server. The switch includes a no-ring telephone call service trigger provisioned on a calling party line at the switch for triggering a query to the application server whenever a telephone call including a no-ring telephone call service request is made by a calling party device. The system further includes a region wide messaging database in communication with the application server and a no-ring telephone call application accessed by the application server. The no-ring telephone call application responds to the query by determining whether a called party telephone number corresponds to a voice mail platform telephone number in the region wide messaging database. When the called party telephone number corresponds to a voice mail platform telephone number, instructions to route the telephone call to the voice mail platform telephone number are communicated to the switch. When the called party telephone number does not correspond to a voice mail platform telephone number, instructions to play a pre-recorded message are communicated to the switch.

Still further embodiments of the present invention include a computer program product for providing a no-ring telephone call service. The computer program product includes a computer-readable storage medium that stores instructions for executing the no-ring telephone call service. The no-ring telephone call service includes a method that receives notification that a telephone call from a calling party device requesting to use the no-ring telephone call service has arrived at a switch. The notification includes a called party telephone number. The method also includes determining if the called party telephone number corresponds to a voice mail platform telephone number in a region wide messaging database. When the called party telephone number corresponds to a voice mail platform telephone number, instructions to route the telephone call to the voice mail platform telephone number are communicated to the switch. When the called party telephone number does not correspond to a voice mail platform telephone number, a pre-recorded message is delivered to the calling party device.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention allow a calling party to leave a message for a called party without causing the called party's telephone to ring. To make a telephone call using the no-ring telephone call service, a calling party first dials a no-ring telephone call service code (e.g., "*21") to signify that the telephone call is a no-ring telephone call. The calling party then dials the called party's telephone number. Any star code (e.g., two digits, three digits) that is not already reserved to signify another service may be utilized as a no-ring telephone call service code. In alternate exemplary embodiments of the present invention, the calling party dials a ten-digit telephone number to access the no-ring telephone call service and then the calling party is prompted to enter the called party telephone number.

In exemplary embodiments of the present invention, the calling party does not have to know whether the called party has a voice mail service in order to use the no-ring telephone call service. If the called party has a voice mail service, then the calling party will be connected directly to the called party's mailbox to leave a message. If the called party does not have a voice mail service, a pre-recorded message will notify the calling party that the called party does not have a mailbox and then the telephone call will be disconnected. In alternate exemplary embodiments of the present invention, the calling party may be given a choice to complete the telephone call and ring the called party if the called party does not have a voice mail service. Exemplary embodiments of the present invention may be implemented in both public switched telephone network (PSTN) and Internet Protocol/Session Initiation Protocol (IP/SIP) environments.

Figure 1:
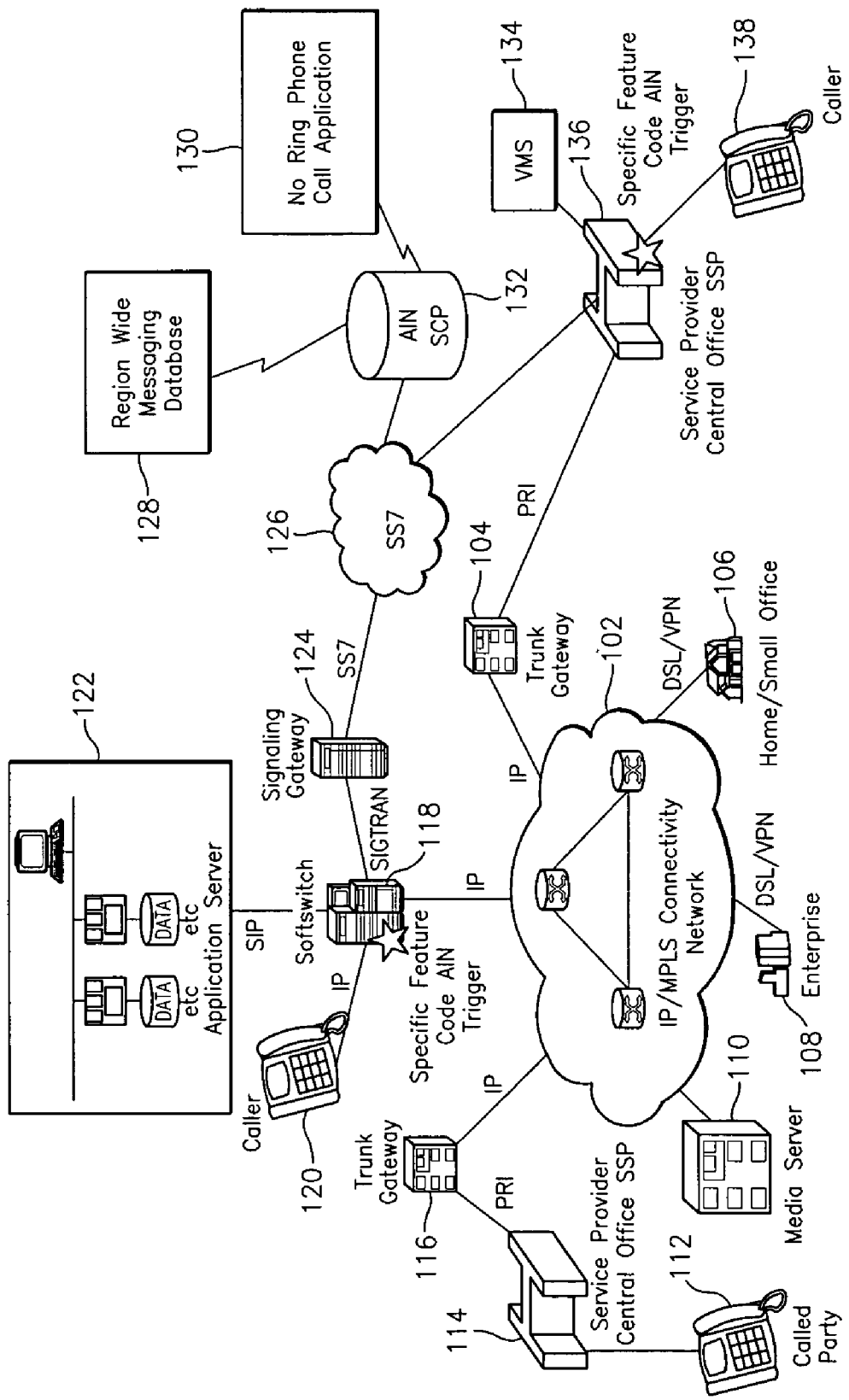
FIG. 1 is a block diagram of an exemplary system for providing a no-ring telephone call service in accordance with exemplary embodiments of the present invention.

FIG. 1 is a block diagram of a system for providing a no-ring telephone call service in accordance with exemplary embodiments of the present invention. Calling and called parties may use any devices that allow them to originate and/or receive telephone calls. Calling party devices and called party devices may be implemented using any devices known in the art including: analog devices, digital devices, integrated services digital network telephones, cellular telephones, hand held telephones, PSTN telephones, IP/SIP telephones, telephones integrated with personal computers via hard telephone and soft telephone clients, and personal digital assistant devices. The system depicted in FIG. 1 includes a PSTN telephone 138 as an example of a calling party device. The PSTN telephone 138 may be utilized by a calling party to place a telephone call using the no-ring telephone call service to a called party at a called party device 112. In addition, the system depicted in FIG. 1 includes an IP/SIP telephone 120 as an example of a calling party device. The IP/SIP telephone 120 may be utilized by a calling party to place a telephone call using the no-ring telephone call service to the called party device 112. The PSTN telephone 138, IP/SIP telephone 120 and called party device 112 may be implemented using conventional landline telephones and/or wireless mobile telephones. In addition, the PSTN telephone 138, IP/SIP telephone 120 and called party device 112 may be located in a variety of geographic locations (e.g., home, car, office). Any combination of PSTN telephones 138 and IP/SIP telephones 120 may be utilized by calling parties and called parties in exemplary embodiments of the present invention.

As depicted in FIG. 1, the PSTN telephone 138 is in communication with a service provider central office service switching point (SSP) 136. When a calling party at the PSTN telephone 138 dials a called party telephone number, the telephone call is transferred to the SSP 136. The SSP 136 may be implemented utilizing any telephone switch known in the art that can communicate with signal control points (SCPs) and that can recognize when a telephone call from the PSTN calling party telephone 138 is a no-ring telephone service telephone call (e.g., by recognizing a trigger such as a feature code trigger). In exemplary embodiments of the present invention, a signaling transfer point (STP), located at the Signaling System (SS7) network 126 depicted in FIG. 1, controls the communication between the Advanced Intelligent Network (AIN) SCP 132 and the SSP 136. The STP is a signaling hub that routes packets of data about a telephone call between the SCP 132 and the SSP 136. The STP routes data to a particular SCP based on information such as the called party telephone number (which may imply a particular region) and the translation type (e.g., no-ring telephone service). The SS7 network 126 carries the data and control messages between the SSP 136 and the SCP 132. In exemplary embodiments of the present invention, the SCP 132 is implemented using a high power fault tolerant computer (e.g., AT&T Star Server FT Model 3300, Lucent Advantage 4P200) and has access to a no-ring telephone call application 130 as well as a region wide messaging database 128.

The service provider central office SSP 136 depicted in FIG. 1 is also in communication with a voice mail system (VMS) 134. The VMS 134, accessed via a voice mail platform telephone number, may service one or more central offices and may be located as depicted in FIG. 1. In alternate exemplary embodiments of the present invention, the VMS 134 is geographically located at a different central office and/or is accessed via an Internet Protocol/MultiProtocol Label Switching (IP/MPLS) network 102. The service provider central office SSP 136 depicted in FIG. 1 is in communication with the IP/MPLS network 102, via a trunk gateway 104 (e.g., a Cisco 5300, a Siemens hiG2000, a Nortel Passport 15000 Packet Voice gateway, a Lucent APX8000 Universal Port gateway) using an interface such as the primary rate interface (PRI). This trunk gateway 104 may be utilized to route telephone calls to other switches, such as service provider central office SSP 114, via the IP/MPLS network 102. To route calls over the IP/MPLS network 102, the IP/MPLS network supports a voice over Internet protocol (VoIP).

FIG. 1 also depicts the IP/SIP telephone 120 that is in communication with an originating switch that is a softswitch 118. When a calling party at the IP/SIP telephone 120 dials a called party telephone number, the telephone call is transferred to the softswitch 118. The softswitch 118 may be implemented using any softswitch hardware that is known in the art (e.g., a Lucent LSS using Sun Netra server, a Siemens SurPass hiQ9200, a Nortel CS3000, an Alcatel A1000, a Telcordia Call Agent-Service Manager) that can communicate with application servers and/or SCPs and that can recognize when a telephone call from the IP/SIP telephone 120 is a no-ring telephone service telephone call (e.g., by recognizing a trigger caused by the calling party entering "*21").

As depicted in FIG. 1, the softswitch 118 is in communication with an application server 122 (e.g., via SIP) and with the IP/MPLS network 102 (e.g., via an Internet protocol (IP)). The IP/MPLS network 102 may be utilized to route telephone calls to other switches (e.g., softswitches and SSPs). In addition, the softswitch 118 communicates with the SS7 network 126 (e.g., to query the SCP 132, to route the call to a VMS 134) via a signaling gateway 124 to translate between the IP and SS7 protocols. The STP within the SS7 network 126 may provide the same functions to the softswitch 118 as discussed previously with regard to the SSP 136.

As depicted in FIG. 1, the called party device 112 is in communication with a service provider central office SSP 114. In turn, the service provider central office SSP 114 is in communication with a trunk gateway 116 that provides an entrance and exit into the IP/MPLS network 102. The IP/MPLS network 102 may support a voice over Internet protocol (VoIP) for routing calls to other switches (e.g., softswitch 118, SSP 136). In addition, FIG. 1 depicts an enterprise 108 and a home/small business 106 in communication with the IP/MPLS network 102. The IP/MPLS network 102 may be implemented with the same network that is already in place to provide services to homes and businesses. Telephone calls may be routed to switches located in enterprises 108, or at other locations accessible by the IP/MPLS network 102. FIG. 1 also includes a media server 110 in communication with the IP/MPLS network 102. The media server 110 may be utilized to play announcements or messages to calling parties located at calling party devices.

The no-ring telephone call application 130 is invoked in response to a switch detecting a no-ring telephone call service request code followed by a; called party telephone number. In exemplary embodiments of the present invention, the no-ring telephone call application 130 verifies that the calling party device is authorized to use the no-ring telephone call service before processing the request. The no-ring telephone call application 130 receives the called party telephone number and accesses the region wide messaging database 128 that includes telephone numbers and associated voice mail platform telephone numbers. The region wide messaging database 128 may include data for one or more regions, and based on the called party telephone number, different region wide messaging databases 128 may be accessed by the application. If the called party telephone number is located in the region wide messaging database 128 and it is associated with a voice mail service, then the no-ring telephone call application 130 sends instructions to the switch to transfer the call directly to the voice mail platform telephone number that corresponds to the called party telephone number. Alternatively, if the called party telephone number is not associated with a voice mail service, then the no-ring telephone call application 130 sends instructions to the switch to play a pre-recorded message to the calling party telling the calling party that the called party does not have a voice mail service and then to disconnect the telephone call. In alternate exemplary embodiments of the present invention, if the called party telephone number is not associated with a voice mail service, then the no-ring telephone call application 130 sends instructions to the switch to play a pre-recorded message to the calling party giving the calling party the option to proceed with a standard telephone call or to be disconnected. Details of the processes performed by the no-ring telephone call application 130 in the PSTN and IP/SIP environments are described below in reference to FIGS. 2 and 3.

In an exemplary embodiment of the present invention, the no-ring telephone call application 130 accesses the region wide messaging database 128 to determine if a called party telephone number is associated with a voice mail service. The region wide messaging database 128 includes a mapping between telephone numbers and associated voice mail systems for a region. Information in the region wide messaging database 128 is used by the no-ring telephone call application 130 to route telephone calls to implement the no-ring telephone call service. In exemplary embodiments of the present invention, the region wide messaging database 128 is implemented as a single database file that includes ten-digit telephone numbers and associated voice mail platform telephone numbers. In other exemplary embodiments of the present invention, the region wide messaging database 128 includes three tables: a table with the telephone numbers of all voice mail subscribers; a table that maps the first six-digits of a telephone number, the area code and exchange (i.e., the Numbering Plan Area (NPA)-NXX)) to a Common Language Location Identifier (CLLI) Code (i.e., the name of the switch); and a table that maps the CLLI code to the voice mail platform. The region wide messaging database 128 may be implemented as a relational database, an object-oriented database, a network database or any other database management system known in the art.

The SCP 132 may contain both the no-ring telephone call application 130 and the region wide messaging database 128 in exemplary embodiments of the present invention. In alternate exemplary embodiments of the present invention, the no-ring telephone call application 130 is located at the SCP 132 and the region wide messaging database 128 is located on a storage device in communication with the SCP 132 via a network (e.g., a local area network (LAN), the IP/MPLS network 102, and/or the SS7 network 126). The region wide messaging database 128 may be physically situated at any location depicted in FIG. 1, including the application server 122 and the enterprise 108. Further embodiments of the present invention include having the no-ring telephone call application 130 and the region wide messaging database 128 being located at or accessed via a host system at the application server 122. In still further exemplary embodiments of the present invention, the no-ring telephone call application 130 located at the application server 122 accesses the region wide messaging database 128 located at the SCP 132. As illustrated by the previous examples, the region wide messaging database 128 and no-ring telephone call application 130 may be geographically located in any number of locations and as is known in the art, other combinations are possible to support the processing described in reference to FIGS. 2 and 3.

Figure 2:
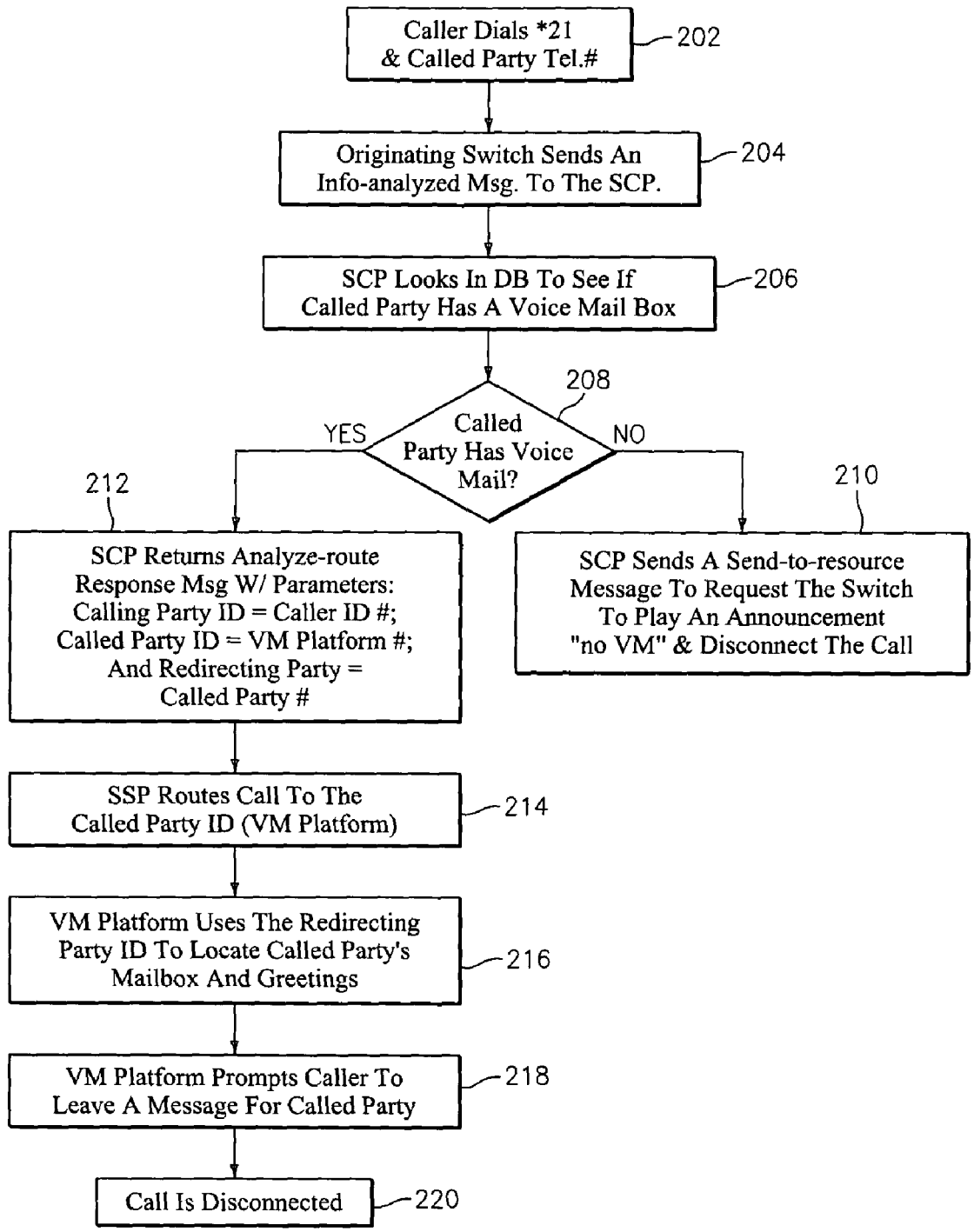
FIG. 2 is a flow diagram of an exemplary process for providing a no-ring telephone call service when the telephone call originates from a telephone in a PSTN network.

FIG. 2 is a flow diagram of an exemplary process for providing a no-ring telephone call service when a telephone call originates from a calling party device in a PSTN network. At 202, a calling party, using the PSTN telephone 138 as a calling party device dials the no-ring telephone call service code (in this example "*21") followed by a called party's telephone number. At 204, the originating switch, SSP 136, detects the no-ring telephone call service code and in response sends an "Info_Analyzed" message to the SCP 132. The "Info_Analyzed" message includes the called party's telephone number, the calling party's telephone number and the no-ring telephone call service code. The STP within the SS7 network 126 may be utilized to map the "Info_Analyzed" message to the correct SCP 132 based on the no-ring telephone call service code and the called party's telephone number. Additionally, the SS7 network 126, as described previously, may be utilized to send messages and data between the SCP 132 and the originating switch, such as SSP 136. At 206, the no-ring telephone call application 130 invoked by the SCP 132 queries the region wide messaging database 128 to determine if the called party has a voice mailbox. If the called party does not have a voice mailbox, as determined at 208, then processing continues to 210. At 210, the SCP 132 sends a "Send-to_Resource" message directing the switch SSP 136 to play a pre-recorded message telling the calling party that the called party does not have a voice mailbox and then to disconnect the telephone call. In alternate exemplary embodiments of the present invention, if the called party does not have a voice mailbox, as determined at 208, then a pre-recorded message is played to the calling party giving the calling party the option to either be disconnected or to complete the telephone call as a standard ring telephone call. If the calling party selects to complete the telephone call as a standard ring telephone call, then the SCP 132 sends a continue message to the SSP 136 which will proceed to complete the telephone call to the called party device.

Referring to FIG. 2, if the called party does have a voice mailbox, as determined at 208, then processing continues to 212. At 212, the SCP 132 returns an "Analyze_Route" response message to the originating switch, such as SSP 136, that includes the following parameters: a CallingPartyID parameter that contains the calling party's telephone number; a CalledPartyID parameter that contains the voice mail platform telephone number associated with the called party's telephone number; and a RedirectingPartyID parameter that contains the called party's telephone number. The no-ring telephone call application 130 invoked by the SCP 132 retrieves this information from the region wide messaging database 128 based on the information supplied with the "Info_Analyzed" message. Next, at 214, the originating switch SSP 136 routes the call to a switch supporting the telephone number contained in the CalledPartyID parameter (i.e., the called party's voice mail platform telephone number) along with the CallingPartyID and RedirectingPartyID parameters. At 216, the called party's VMS 134 uses the data contained in the RedirectingPartyID parameter to locate the called party's mailbox and greeting. The VMS 134 plays the greeting to the calling party and at 218, prompts the calling party to leave a message for the called party. At 220, the telephone call is disconnected.

Figure 3:
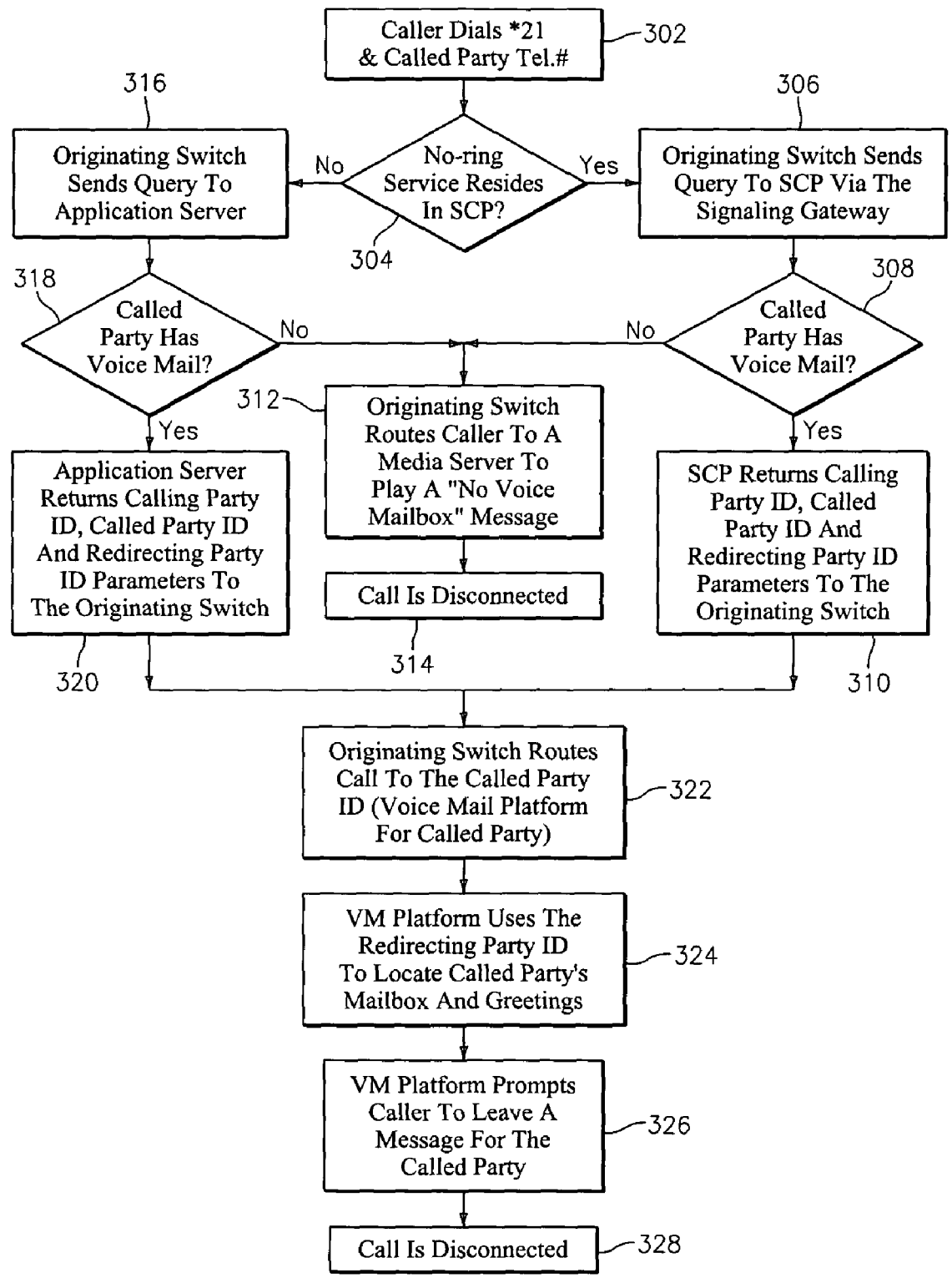
FIG. 3 is a flow diagram of an exemplary process for providing a no-ring telephone call service when the telephone call originates from an IP/SIP telephone.

FIG. 3 is a flow diagram of an exemplary process for providing a no-ring telephone call service when a telephone call originates from a calling party device in an IP/SIP network. At 302, a calling party, using an IP/SIP telephone 120 as the calling party device dials the no-ring telephone call service code (in this example "*21") followed by a called party's telephone number. The originating switch, the softswitch 118, detects the no-ring telephone call service code. If the no-ring telephone call application 130 resides in an SCP, as determined at 304, then processing continues to 306. At 306, the softswitch 118 sends an "Info_Analyzed" message to the SCP 132 via signaling gateway 124. The "Info_Analyzed" message includes the called party's telephone number, the calling party's telephone number and the no-ring telephone call service code. As described previously, the STP within the SS7 network 126 may be utilized to map the "Info_Analyzed" message to the correct SCP 132 based on the no-ring telephone call service code and the called party's telephone number. Additionally, the SS7 network 126, as described previously, may be utilized to send messages and data between the SCP 132 and the softswitch 118.

At 308, the no-ring telephone call application 130 invoked by the SCP 132 queries the region wide messaging database 128 to determine if the called party has a voice mailbox. If the called party does not have a voice mailbox, as determined at 308, then processing continues to 312. At 312, the SCP 132 sends a "Send-to_Resource" message directing the softswitch 118 to play an announcement located at the media server 110 informing the calling party that the called party does not have a voice mailbox. Next, at 314, the telephone call is disconnected. As described previously, in reference to FIG. 2, in alternate exemplary embodiments of the present invention, if the called party does not have a voice mailbox, as determined at 308, then a pre-recorded message is played to the calling party giving the calling party the option to either be disconnected or to complete the telephone call as a standard ring telephone call.

If the called party does have a voice mailbox, as determined at 308, then processing continues to 310. At 310, the SCP 132 returns an "Analyze Route" response message to the softswitch 118 that includes the following parameters: a CallingPartyID parameter that contains the calling party's telephone number; a CalledPartyID parameter that contains the voice mail platform telephone number associated with the called party's telephone number; and a RedirectingPartyID parameter that contains the called party's telephone number. The no-ring telephone call application 130 invoked by the SCP 132 retrieves this information from the region wide messaging database 128 based on the information supplied with the "Info_Analyzed" message. The processing continues to 322.

Alternatively, if the no-ring telephone call application 130 resides in the application server 122, as determined at 304, then processing continues to 316. At 316, the softswitch 118 sends an "Info_Analyzed" message to the application server 122 via a protocol such as SIP. The "Info_Analyzed" message includes the called party's telephone number, the calling party's telephone number and the no-ring telephone call service code. At 316, the no-ring telephone call application 130 invoked by the application server 122 queries a database to determine if the called party has a voice mailbox. The database queried by the application server 122 is either the region wide messaging database 128 associated with the called party's telephone number or a database containing the same type of information (e.g., telephone numbers and associated voice mail platform numbers). If the called party does not have a voice mailbox, as determined at 318, then processing continues to 312 and 314 as described previously.

If the called party does have voice mailbox, as determined at 318, then processing continues to 320. At 320, the no-ring telephone call application 130 invoked by the application server 122 returns an "Analyze_Route" response message that includes the following parameters: a CallingPartyID parameter that contains the calling party's telephone number; a CalledPartyID parameter that contains the voice mail platform telephone number associated with the called party's telephone number; and a RedirectingPartyID parameter that contains the called party's telephone number. The application sever 122 retrieves this information from a database such as the region wide messaging database 128 based on the information supplied with the "Info_Analyzed" message. The processing continues to 322.

At 322, processing is performed if the called party has a voice mailbox and the no-ring telephone application 130 resides in either the application server 122 or the SCP 132. At 322, the softswitch 118 routes the call to the telephone number contained in the CalledPartyID (the called party's voice mail platform telephone number) along with the CalledPartyID and RedirectingPartyID parameters. At 324, the called party's VMS 134 uses the data contained in the RedirectingPartyID parameter to locate the called party's mailbox and greeting. The VMS 134 plays the greeting to the calling party and at 326, prompts the calling party to leave a message for the called party. At 328, the telephone call is disconnected.

The no-ring telephone call service allows a calling party to determine whether Or not to attempt to speak to a called party, by ringing the called party's telephone, before leaving a message. This may result in substantial time-savings for the calling party who wants to leave a brief message and does not have the time and/or desire to engage the called party in a conversation. Additionally, using the no-ring telephone call service may reduce the number of interruptions that a called party receives because calling parties are no longer forced into making an attempt to reach the called party in person before leaving a message.

As described above, embodiments in the form of computer-implemented processes and apparatuses for practicing those processes. In exemplary embodiments, the no-ring telephone call service is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the no-ring telephone call service. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the no-ring telephone call service. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing a no-ring telephone call service, the method comprising:
   receiving notification that a telephone call from a calling party device requesting to use the no-ring telephone call service has arrived at a switch, the notification including a called party telephone number; and
   determining if the called party telephone number corresponds to a voice mail platform telephone number in a region wide messaging database, wherein:
      when the called party telephone number corresponds to a voice mail platform telephone number, instructions to route the telephone call to the voice mail platform telephone number are communicated to the switch;
      when the called party telephone number does not correspond to a voice mail platform telephone number and the calling party device is utilizing the no-ring telephone call service, instructions to play a pre-recorded message are communicated to the switch, the pre-recorded message including a direct connect option for completing the telephone call to the called party telephone number including ringing a device at the called party telephone number; and
      when the calling party device selects the direct connect option, the no-ring telephone call application sends instructions to the switch to complete the telephone call.

2. The method of claim 1 wherein the instructions to route the telephone call include the voice mail platform telephone number and the called party telephone number.

3. The method of claim 1 wherein the region wide messaging database includes voice mail platform telephone number attributes and called party telephone number attributes.

4. The method of claim 1 wherein the notification is received at an application server.

5. The method of claim 1 wherein the notification is received at a service control point.

6. The method of claim 1 further comprising:
   verifying that the calling party device is authorized to use the no-ring telephone call service; and
   if the verifying results in a determination that the calling party device is not authorized to use the no-ring telephone call service then sending instructions to the switch to play a pre-recorded not authorized message to the calling party device.

7. The method of claim 1 wherein the request is initiated by a calling party entering a no-ring telephone call service code into the calling party device.

8. The method of claim 1 wherein the calling party device is a public switched telephone network enabled telephone and the switch is a service provider central office service switching point.

9. The method of claim 1 wherein the calling party device is an Internet protocol/session initiation protocol enabled telephone and the switch is a softswitch in communication with the Internet.

10. A system for providing a no-ring telephone call service, the system comprising:
    a service control point;
    a switch in communication with the service control point, the switch including a no-ring telephone call service trigger provisioned on a calling party line at the switch for triggering a query to the service control point whenever a telephone call including a no-ring telephone call service request is made by a calling party device;
    a region wide messaging database in communication with the service control point; and
    a no-ring telephone call application accessed by the service control point for responding to the query by determining whether a called party telephone number corresponds to a voice mail platform telephone number in the region wide messaging database, wherein:
       when the called party telephone number corresponds to a voice mail platform telephone number, the no-ring telephone call application sends instructions to the switch to route the telephone call to the voice mail platform telephone number;
       when the called party telephone number does not correspond to a voice mail platform telephone number and the calling party device is utilizing the no-ring telephone call service, the no-ring telephone call application sends instructions to the switch to play a pre-recorded message, the pre-recorded message including a direct connect option for completing the telephone call to the called party telephone number including ringing a device at the calling party telephone number; and when the calling party device selects the direct connect option, the no-ring telephone call application sends instructions to the switch to complete the telephone call.

11. The system of claim 10 wherein the switch is a softswitch.

12. The system of claim 10 wherein the switch is a service switching point.

13. The system of claim 10 wherein the switch is a service provider central office service switching point.

14. The system of claim 10 wherein the calling party device is a public switched telephone network enabled telephone.

15. The system of claim 10 wherein the calling party device is an Internet protocol/session initiation protocol enabled telephone.

16. The system of claim 10 wherein the called party device is a public switched telephone network enabled telephone.

17. The system of claim 10 wherein the called party device is an Internet protocol/session initiation protocol enabled telephone.

18. The system of claim 10 wherein the service control point is an advanced intelligent network service control point.

19. The system of claim 10 wherein the no-ring telephone call application is remote from the service control point.

20. The system of claim 10 wherein the no-ring telephone call application is part of an application server that is in communication with the service control point.

21. The system of claim 10 wherein the telephone call is routed via a packet switching network.

22. A system for providing a no-ring telephone call service, the system comprising:

an application server;

a switch in communication with the application server, the switch including a no-ring telephone call service trigger provisioned on a calling party line at the switch for triggering a query to the application server whenever a telephone call including a no-ring telephone call service request is made by a calling party device;

a region wide messaging database in communication with the application server; and a no-ring telephone call application accessed by the application server for responding to the query by determining whether a called party telephone number corresponds to a voice mail platform telephone number in the region wide messaging database, wherein:

when the called party telephone number corresponds to a voice mail platform telephone number, the no-ring telephone call application sends instructions to the switch to route the telephone call to the voice mail platform telephone number;

when the called party telephone number does not correspond to a voice mail platform telephone number and the calling party device is utilizing the no-ring telephone call service, the no-ring telephone call application sends instructions to the switch to play a pre-recorded message, the pre-recorded message including a direct connect option for completing the telephone call to the called party telephone number including ringing a device at the calling party telephone number; and when the calling party device selects the direct connect option, the no-ring telephone call application sends instructions to the switch to complete the telephone call.

23. The system of claim 22 wherein the pre-recorded message is stored on a media player in communication with the switch.

24. The system of claim 22 wherein the telephone call is routed via a packet switching network.

25. A storage medium encoded with machine readable computer program code for facilitating a no-ring telephone call service, the storage medium including instructions for causing a server to implement a method, comprising:

receiving notification that a telephone call from a calling party device requesting to use the no-ring telephone call service has arrived at a switch, the notification including a called party telephone number; and determining if the called party telephone number corresponds to a voice mail platform telephone number in a region wide messaging database, wherein:

when the called party telephone number corresponds to a voice mail platform telephone number, the telephone call is routed to the voice mail platform telephone number;

when the called party telephone number does not correspond to a voice mail platform telephone number and the calling party device is utilizing the no-ring telephone call service, a pre-recorded message is delivered to the calling party device, the pre-recorded message including a direct connect option for completing the telephone call to the called party telephone number including ringing a device at the calling party telephone number; and when the calling party device selects the direct connect option, the no-ring telephone call application sends instructions to the switch to complete the telephone call.

* * * * *